United States Patent
Chakraborty et al.

(10) Patent No.: US 12,412,118 B2
(45) Date of Patent: Sep. 9, 2025

(54) PRIVATE COMPUTATION OF AN AGENT DATA ATTRIBUTION SCORE IN COLLABORATED TASK

(71) Applicant: INTERNATIONAL BUSINESS MACHINES CORPORATION, Armonk, NY (US)

(72) Inventors: Supriyo Chakraborty, White Plains, NY (US); Ashish Verma, Nanuet, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 17/121,702

(22) Filed: Dec. 14, 2020

(65) Prior Publication Data

US 2022/0188692 A1     Jun. 16, 2022

(51) Int. Cl.
  *G06N 3/098*     (2023.01)
  *G06N 20/00*     (2019.01)

(52) U.S. Cl.
  CPC ............. *G06N 20/00* (2019.01); *G06N 3/098* (2023.01)

(58) Field of Classification Search
  CPC ................................ G06N 20/00; G06N 3/098
  See application file for complete search history.

(56) References Cited

U.S. PATENT DOCUMENTS

| | | | |
|---|---|---|---|
| 10,552,763 B2 | 2/2020 | Weibel et al. | |
| 2019/0156247 A1* | 5/2019 | Faulhaber, Jr. | ........ G06N 3/045 |
| 2020/0125739 A1 | 4/2020 | Verma et al. | |
| 2021/0174257 A1* | 6/2021 | Pothula | ................... G06F 16/27 |

FOREIGN PATENT DOCUMENTS

| | | |
|---|---|---|
| CN | 110490738 A | 11/2019 |
| CN | 110572253 A | 12/2019 |
| CN | 110598870 A | 12/2019 |
| CN | 110610242 A | 12/2019 |
| CN | 110874647 A | 3/2020 |
| CN | 110908893 A | 3/2020 |
| CN | 110910158 A | 3/2020 |

OTHER PUBLICATIONS

Mell, P. et al., "Recommendations of the National Institute of Standards and Technology"; NIST Special Publication 800-145 (2011); 7 pgs.

(Continued)

*Primary Examiner* — Sanchita Roy
(74) *Attorney, Agent, or Firm* — CHIP LAW GROUP

(57) ABSTRACT

A computer-implemented method of determining an agent data attribution and selection to perform a collaborative data-related task includes computing an agent data attribution score for each agent of the plurality of agents associated with the collaborative data-related task. A subset of the plurality of agents that participate in the collaborative data-related task is selected based on the agent data attribution score. An instruction is transmitted to the selected subset of the plurality of agents for each agent to conduct a respective portion of the collaborative data-related task.

19 Claims, 10 Drawing Sheets

(56) References Cited

OTHER PUBLICATIONS

Goodfellow, I. J., et al., "Generative Adversarial Nets"; arXiv:1406.2661v1 [stat.ML] (2014); 9 pgs.
Abadi, M. et al., "Deep Learning with Differential Privacy"; arXiv:1607.00133v2 [stat.ML] (2016); 14 pgs.
Musketeer—"Machine learning to augment shared knowledge in federated privacy-preserving scenarios"; https://musketeer.eu, downloaded Dec. 14, 2020; 7 pgs.
Jagota, A., "Data Sketches: An Overview Streamability, Mergeability, and How They Relate to Usual Statistical Models", Level Up Coding 2023), 19 pgs.
Coleman et al., "A One-Pass Private Sketch for Most Machine Learning Tasks", Data Structures and Algorithms, Jun. 16, 2020, 12 pages.
Jagota Arun, "Data Sketches: An Overview", Streamability, mergeability, and how they relate to usual statistical models, Feb. 17, 2023, 19 pages, https://levelup.gitconnected.com/data-sketches-an-overview-dcb87bb8a740.
Zhao et al., "Differentially Private Linear Sketches: Efficient Implementations and Applications", 36th Conference on Neural Information Processing Systems (NeurIPS 2022), Oct. 14, 2022, 18 pages.
Dwork, et al., The Algorithmic Foundations of Differential Privacy, Theoretical Computer Science, Aug. 11, 2014, vol. 9, Nos. 3-4, pp. 211-407.
Kairouz, et al., Advances and Open Problems in Federated Learning, arXiv: 1912.04977v3 [cs.LG], Mar. 9, 2021, 121 pages.
Mcmahan, et al., Communication-Efficient Learning of Deep Networks from Decentralized Data, arXiv: 1602.05629v4 [cs.LG], Jan. 26, 2023, 11 pages.

\* cited by examiner

PRIVATE COMPUTATION OF AN AGENT DATA ATTRIBUTION SCORE IN COLLABORATED TASK

BACKGROUND

Technical Field

The present disclosure generally relates to computer-implemented methods and systems for performing collaborative tasks and more particularly, to the computation of agent attribution scores to perform collaborative tasks.

Description of the Related Art

Federated learning is one type of machine learning in which the data used to train models remain decentralized. Due to privacy concerns regarding the data, federated learning is one of the ways in which the data and resources of multiple agents is used to train models without exposing the respective data of each of the multiple agents. For example, the data of each agent can be used to train a respective model, and then the models are shared with a centralized server. Multiple iterations may be required between the agents and the server before the global model converges. This model can be then shared with all the agents.

There are two basic types of federated learning model deployment, a cross-device deployment, and a cross-silo deployment. The cross-device deployment can have millions of agents offering to participate, and such agents are randomly selected and each typically contributes small fractions to the globalized model. However, in the cross-silo deployment, typically 10-100 agents participate (which may be in an Enterprise setting), and their contribution to the globalized model is significantly larger than in a cross-device deployment.

In the cross-silo deployment, all of the agents offering to contribute to the globalized model can cause problems with redundancy and inefficiency in developing the globalized model. Some of the agents may not provide data sufficiently accurate for federated learning purposes. The contributions of the agents relative to the construction of the globalized model can be non-linear and difficult to determine. Thus, there is a need to determine how to select a subset of the agents and develop a globalized model that is constructed as efficiently and accurately as possible.

Accordingly, there is a need for a computer-implemented method and device to manage collaborative tasks in which agent participants can be selected to provide for efficient and accurate training models and to determine an individual agent's contribution to the performance of the collaborative tasks.

SUMMARY

According to one embodiment, a computer-implemented method of determining an agent data attribution and selection to perform a collaborative data-related task includes computing an agent data attribution score for each agent of the plurality of agents associated with the collaborative data-related task. A subset of the plurality of agents to participate in the collaborative data-related task is selected based on the agent data attribution score. An instruction is transmitted to the selected subset of the plurality of agents for each agent to conduct a respective portion of the collaborative data-related task. A more accurate training model is created, and the server uses the attribution scores to rank the participating agents and select the subset that maximizes the accuracy of a global model.

In one embodiment, a private sketch of data and resources of a plurality of agents associated with the collaborative data-related task is received, and one or more of the plurality of agents is excluded from the computing of the agent data contribution score based on a lack of a diversity of data compared with a remainder of the plurality of agents. The results of the collaborative data-related task are received from the subset of selected agents including local parameters, and fused parameters are generated from the received local parameters and an instruction is transmitted to at least some of the selected subset of the plurality of agents to conduct the respective portion of the collaborative data-related task using fused parameters iteratively. The use of fused parameters from the server that are provided to the agent improves the accuracy of the models created by the individual agents, and in turn, improves the global model created by the server.

In one embodiment, refined results are received from the selected agents based on the fused parameters, and a global training model is generated based on the refined results. The global training model has increased accuracy based on the models created by the agents.

In one embodiment, the selecting of the subset of the plurality of agents includes precluding one or more agents from participating in the collaborative data-related task by determining whether an accuracy of the fused parameters improves by having the one or more agents participate in the collaborative data-related task. Through the use of a simulated federation, there is an improvement in the collaborative data-related task by the preclusion of agents having less accuracy and insufficient data diversity.

In one embodiment, the selecting of the subset of the plurality of agents includes precluding one or more agents from participating in the collaborative data-related task based on a relatively lower amount of data diversity as compared with other agents under consideration for selection. The greater the amount of data diversity, the more accurate and efficient the global model will be training, and precluding agents with relatively low amounts of data diversity as compared to other agents reduces redundant processes (free up computer resources), saves power, time for the obtaining the results that might have an insignificant improvement or degradation with the inclusion of agents with relatively low amounts of data diversity.

In one embodiment, the private sketch of data of the plurality of agents includes private data generator models summarizing the data distribution of each agent of the plurality of agents, and the method further includes performing a data diversity check of a private data generator model for each of the plurality of agents. The performance of tests at the server is based on information presented by the clients before the start of the federation process. The private generator models protect the privacy of the agents' data by creating synthetic data to select agents even before performing an actual federated learning operation.

In one embodiment, the performing of the data diversity check includes determining private centroids and silhouette scores of data clusters of each of the private generator models, wherein the centroids reflect a concentration of the data and the silhouette scores reflect a tightness of the cluster. The server advantageously uses this information to exclude agents that introduce no diversity.

In one embodiment, the received private sketch of data of the plurality of agents includes private coresets of data that approximate a shape and distribution of the data, and there is a performing of a data diversity check by clustering the private coresets of data and comparing an arrangement of cluster centroids for diversity. The server can use the obtained data sketches to perform clustering more efficiently and use the cluster centroids to determine diversity between the clients In one embodiment, a summary sketch of data of the plurality of agents includes a respective private data generator model summarizing the data distribution of each agent of the plurality of agents, and the computing of the agent data attribution score further includes generating synthetic data from a corresponding data distribution of the private generator model of each agent from a corresponding data distribution. Agent-specific models are trained using the generated synthetic data. There is an improvement in the protection of the privacy of agents' data.

In one embodiment, the generated synthetic data is pooled to train a global model. A more accurate global model is created that better protects the data of the agents.

In one embodiment, the collaborative data-related task includes generating a global training model by federated learning using the summary sketch of data and resources information of at least the subset of the plurality of agents. The use of a selected subset of agents provides for a more efficient and accurate training model.

In one embodiment, the collaborative data-related task includes computing a collaborative function estimation of the summary sketch of data and resources information of at least the subset of the plurality of agents. The collaboration function estimation of the summary sketch data can provide feedback as to the accuracy of the performance of a collaborative data-related task.

In one embodiment, the collaborative data-related task includes computing a collaborative abnormality prediction based on the summary sketch of data and resources information of at least the subset of the plurality of agents. The abnormality prediction is used to increase the accuracy of a training model being generated.

In one embodiment, the collaborative data-related task includes computing a federated inference based on the summary sketch of data and resources information of at least the subset of the plurality of agents. The use of a federated inference is used to increase the accuracy of a training model being generated.

In an embodiment, a computing device for determining an agent data attribution and selection to perform a collaborative data-related task, the computing device includes a processor. A memory is coupled to the processor, the memory storing instructions to cause the processor to perform acts that include computing an agent data attribution score for each agent of the plurality of agents associated with the collaborative data-related task. A subset of the plurality of agents is selected to participate in the collaborative data-related task based on the agent data attribution score. An instruction is transmitted to the selected subset of the plurality of agents for each agent to conduct a respective portion of the collaborative data-related task. A more accurate training model is created, and the server uses the attribution scores to rank the participating agents and select the subset that maximizes the accuracy of a global model.

In one embodiment, additional instructions cause the processor to perform additional acts that include: receive a private sketch of data and resources of a plurality of agents associated with the collaborative data-related task is received, and exclude one or more of the plurality of agents from the computing of the agent data contribution score based on a lack of a diversity of data compared with a remainder of the plurality of agents. The results of a portion of the collaborative data-related task is received from the subset of selected agents including local parameters, and fused parameters are generated from the received local parameters, and an instruction is transmitted to at least some of the selected subset of the plurality of agents to conduct an iteration the respective portion of the collaborative data-related task using the fused parameters. The use of fused parameters from the server that are provided to the agent improves the accuracy of the models created by the individual agents, and in turn, improves the global model created by the server.

In one embodiment, additional instructions cause the processor to perform additional acts including: receiving refined results from the selected agents based on the fused parameters and generating a global training model based on the refined results. A more accurate global model results from these additional acts.

In one embodiment, additional instructions cause the processor to perform additional acts including selecting the subset of the plurality of agents by precluding one or more agents from participating in the collaborative data-related task based on a relatively lower amount of data diversity as compared with other agents under consideration for selection. The preclusion of agents with relatively lower data diversity reduces redundancy in computer operations and saves on computing time with fewer computations that would have resulted in a marginal improvement or possible degradation by their inclusion.

In one embodiment, additional instructions cause the processor to perform additional acts including generating synthetic data from a corresponding data distribution of a private generator model of each agent from a corresponding data distribution, and training agent-specific models using the generated synthetic data. The generation of synthetic data improves the privacy of the agents' data.

In an embodiment, a non-transitory computer-readable storage medium tangibly embodying a computer-readable program code having computer-readable instructions that, when executed, causes a computer device to perform a method of determining an agent data attribution and selection to perform a collaborative data-related task, the method including optionally receiving a private sketch of data and resources from each of a plurality of agents associated with the collaborative data-related task to exclude one or more agents based on data diversity. An agent data attribution score is computed for each agent of the plurality of agents associated with the collaborative data-related task. A subset of the plurality of agents is selected to participate in the collaborative data-related task based on the agent data attribution score. An instruction is transmitted to the selected subset of the plurality of agents for each agent to conduct a respective portion of the collaborative data-related task. Results are received including local parameters from the subset of selected agents instructed to conduct the respective portion of the collaboratively performed data-related task, and a global training model is generated based on the received results. A more accurate training model is created, and the server uses the attribution scores to rank the participating agents and select the subset that maximizes the accuracy of a global model.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
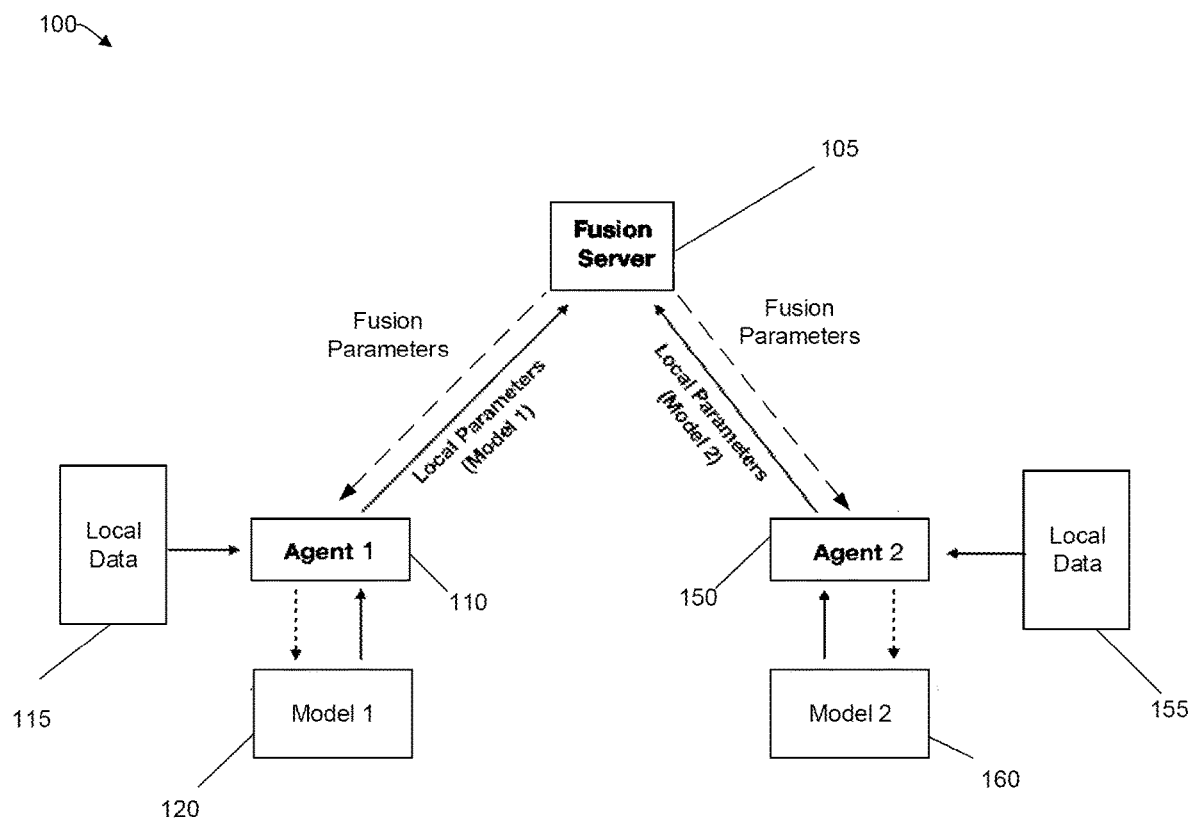
FIG. 1 illustrates a general overview of a federated learning system.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

It is to be understood that, as used herein, the term "differential privacy" refers to a method of sharing information about a dataset public based on a description of patterns of groups within the dataset, and withholding identifying information about individuals in the dataset to preserve privacy.

The computer-implemented method and device of the present disclosure provide for an improvement in the fields of collaborative task performance and federated learning as applied to various disciplines. Increased accuracy in the generation of a training model in federated learning also increases the efficiency of computer operations. Such improvements in computer operations result in a reduction in the amount of processing requirements and power. For example, improved training models in federated learning increases the accuracy of computer operations, providing improved results in fewer iterations, thus freeing computer resources. There is also realized a time savings using the teachings of the present disclosure.

In an overview, in a first operation, which is optionally implemented in a solution, participating users are required to provide a private sketch of their local data. This private sketch could be implemented in a variety of ways, including private coresets. The data received from each agent is then used to determine data diversity between the agents. One possible strategy is via clustering. Data sketches from the agents are clustered and then various properties of the generated clusters, e.g., centroids and distance from the centroids could be used to determine the diversity of data between the various agents.

For example, if there are multiple agents that provide very similar data points, only one, or a few (not all) maybe selected (either randomly or based on some other criterion). This operation is a data diversity-based filtering of agents. The test is designed such that most of the agents make it to the next operation. Only the agents that provide little or no additional diversity are eliminated.

In a second operation, the data attribution score for each agent is computed. The data attribution score is an estimate of the relative contribution that an agent will make to the accuracy of the global model. Since, the model is non-linear and complex, there is no easy way to estimate this contribution from each agent. Thus, the present disclosure provides an improvement by proposing a simulation-based strategy.

Each agent is required to send a private generator model of its local data. This generator model can be used to synthesize samples from the local distribution of an agent. Once the server receives these generator models, the server synthesizes synthetic data for each agent and initiates a simulation of federated learning. During this simulation, the server uses, for example, a greedy algorithm (one specific instantiation) to incrementally select agents. Each time the server (performing simulation) selects an agent, it also computes an attribution score for the agent. This attribution score quantifies the estimated improvement in the accuracy of the global model on inclusion of this agent.

Once attribution scores have been computed for each agent, these scores can be used to select a subset of agents for the actual federation to begin between the selected agents. To initiate the process, the server initializes a model with random parameters (no training has happened thus far). These parameters are then shared with the agents.

The agents use the received parameters to instantiate a local model and train it using their local data. The trained model parameters are shared with the server. The server fuses parameters received from the different agents using some algorithm (e.g., FedAvg) and generates the fused parameters (of a global model). These fused parameters are sent back the agents for the start of the next round.

In the next round, the agents use the parameters received from the server to instantiate a new model, and again train that model on their local data before sharing the parameters with the server. The iterations continue until the global model at the server reaches convergence.

FIG. 1 illustrates a general overview of a federated learning system 100. A fusion server 105 configured to perform a fusion algorithm in a federated learning environment. Each agent 110, 150, has respective local data 115, 155 that are used to train respective models (first model 120, second model 160). Each agent 110, 150 provides local parameters to the fusion server 105 and receives fusion parameters. The models 120, 160 are then updated with the fusion parameters and then provided to the fusion server 105 until the globalized model is provided by the fusion server 105 to all the participants in the federated learning system.

Thus, each agent 110, 150 contributes to the globalized model without sharing their data.

Example Architecture

Figure 2:
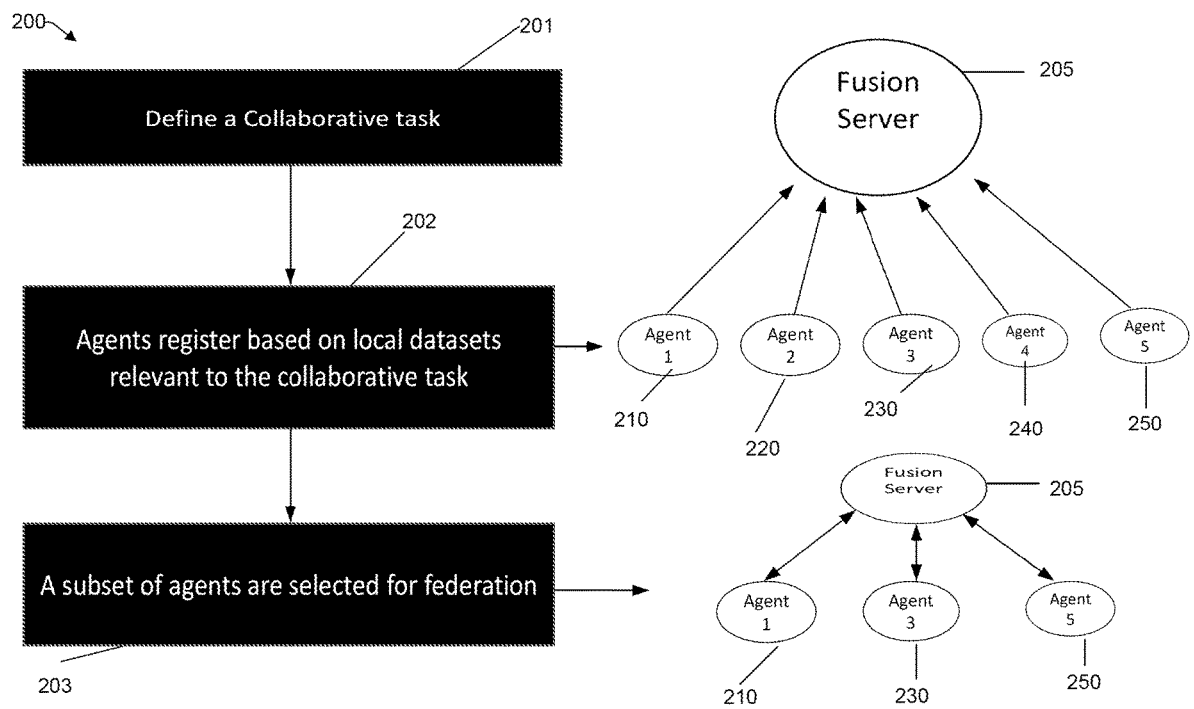
FIG. 2 provides an architectural overview of a system for performing a collaborative task, consistent with an illustrative embodiment.

FIG. 2 provides an architectural overview of a system for performing a collaborative task 200, consistent with an illustrative embodiment. According to this illustrative embodiment, the solution to the value attribution problems, assess a "value" that a registered agent, if selected, brings to the federation process, and whether a federation between certain agents results in any improvement in model accuracy involves performing tests at the server based on information presented by the clients before the start of the federation process. The basic operations define a collaborative task 201, register agents based on local datasets relevant to the collaborative task 202, and select a subset of agents for federation. FIG. 2 shows a fusion server 205 and agents 210, 220, 230, 240, 250 registering to participate in the collaborative task. Each agent 210-250 provides the fusion server 205 with private data generator models summarizing their data distribution. It is to be understood that, while a fusion server 205 that performs a fusion algorithm is shown, the present disclosure is not limited to the use of a fusion server.

FIG. 2 also shows the fusion server 205 after the selection of a subset of the agents 210, 230, 230 based on criteria that include one or more of a data diversity check and a model specific check using a server-based simulation of the federation to privately determine the attribution score of each agent. The server uses the attribution scores to rank the participating agents and select the subset that maximizes the accuracy of a global training model. The same model structure in the model specific check is used in the final federation to estimate the effect of data diversity in the agents on the model accuracy. Due to the non-linearity in the model architecture, it is difficult to estimate the improvement without the actual simulation. It is also to be understood that it is within the teachings of this disclosure that the data diversity check can be optional, and the server may directly perform the model specific check. Conversely, it is also within the teachings of this disclosure to skip the model specific check and use all the agents selected on the data diversity check to perform the federation.

Figure 3:
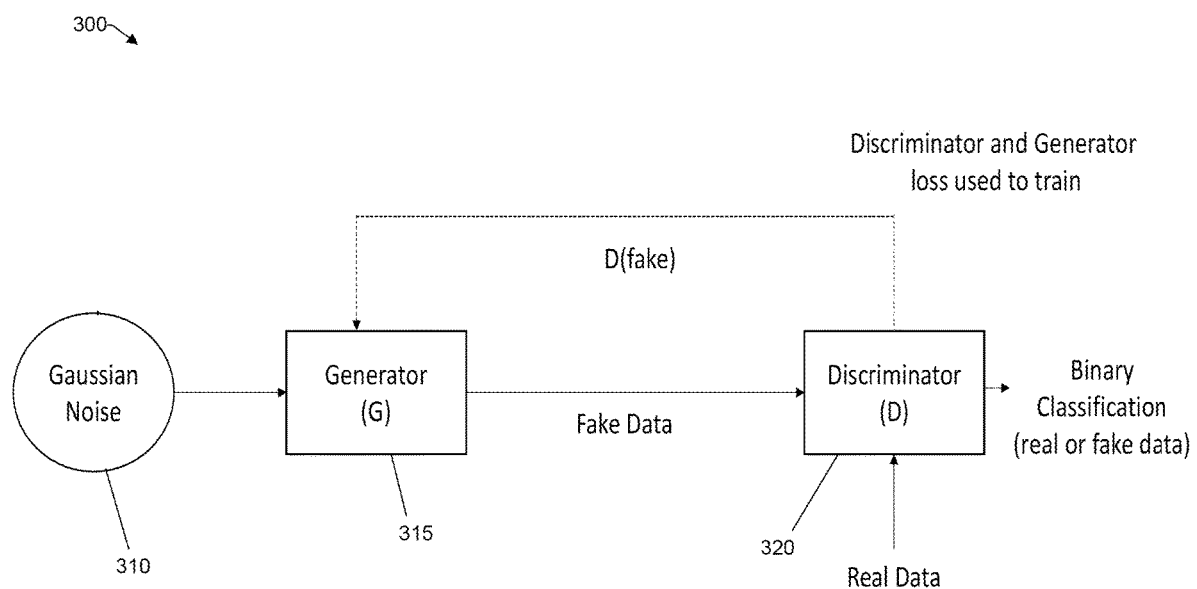
FIG. 3 illustrates a private data generator model, consistent with an illustrative embodiment.

FIG. 3 illustrates a private data generator model 300, consistent with an illustrative embodiment. As shown in FIG. 3, an input of Gaussian noise 310 is provided to a generator 315. Gaussian noise 310 is used in machine learning to generate data with an underlying regularity, for example, when testing multiple items. The generator 315 in turn generates "fake" (e.g., synthetic) data this is provided to a discriminator 320. The generator 315 does not have direct access to actual agent data in a federated learning environment. However, if the discriminator 320 is differentially private, then via post-processing the generator 310 will be differentially private. A Differentially-Private Stochastic Gradient Descent (DP-SGD) is one way to make the discriminator 320 differentially private. The output from discriminator 315 may be fed back to generator 310 and may be used for binary classification. The generator 310 and discriminator 315 can be used together to train the private generator model of an agent that is provided to a server (e.g., the fusion server 205 shown in FIG. 2) for comparison among the private generator models of other agents for data diversity and/or to create an attribution score to aid in the selection of a subset of agents.

TABLE 1

Value Attribution Algorithm for agents in Federated Learning

Require: Generator Set: $\{G_1, G_2, \ldots G_n\}$, $D_{test}$, Accuracy tolerance $\varepsilon$, Num. of agents to select K
1: Generate datasets $D_1, D_2, \ldots, D_n$ using generators for each agent
2: Generate $Dg = \cup^n_{i=1} D_i$ and use it to train model M
3: $ag = Acc(M_g, D_{test})$
   ag is the accuracy of the global model Mg on the test dataset Dtest
4: $L = 0$
   L stores the set of agents selected for federation
5: $aL = 0$
   aL is the fusion accuracy of the models in L
6: $n_i = 0$ for $i = 1, \ldots, n$
   initiate the attribute scores $n_i = 0$ for $i = 1, \ldots, n$
7: while $(|L| \leq K)$ and $(a_g - a_L) \geq \varepsilon$ do
8: if $L == \emptyset$ then
9: $M_{fusion} = M_{random}$
   $M_{random}$ is obtained by random initialization of model parameters
10: else
11: $M_{fusion} = \oplus_{i \in L} M_i$
12: end if
13: Simulate federation between n agents with $M_{fusion}$ as starting model
for $i = 1, \ldots, n$, Initialize $M_i = M_{fusion}$. Then locally train $M_i$ using $D_i$ respectively.
Choose the federated learning hyper-parameters accordingly.
If a simulated federation involves fusion, then we use the local model before the final round of fusion.
14: Compute $a_j = Acc\ (\oplus_{i \in L} M_i \oplus M_j, D_{test})$ for $j = [n] \backslash L$
15: Compute $a_j = a_j - a_L$ for $j = [n] \backslash L$ #
$[n] = 1, \ldots, n$
16: Find $m$ such that $\dfrac{am}{ag - al} \geq \dfrac{aj}{ag - al}\ \forall\ j \neq m, j \in [n] \backslash L$
17: $L = L \cup \{m\}$
18: $n_m = \dfrac{am}{ag}$

TABLE 1-continued

Value Attribution Algorithm for agents in Federated Learning

19: aL =Acc($_{i \in L}$Mi, Dtest)
20: end while
21: return {$n_1, n_2 \ldots n_n$}

Note,
$\oplus$ represents the fusion operator.
For example, it could be the FedAvg algorithm.
The fusion operator takes in two models and returns a single model.

Table 1 above shows an algorithm for value attribution for agents in Federated Learning, consistent with an illustrative embodiment. It is to be understood that Table 1 is one instantiation of an implementation for computing value attribution for each user.

A generator set is used that specifies the Generated models $G_1, G_2, G_3 \ldots G_n$, the data tested $D_{test}$, accuracy tolerance, and a number K of agents to select (K is a subset of an initial number N of agents or a subset of an M number of subsets reduced via a data diversity check).

In each round, a new agent is added for federation. This operation continues until the number of selected agents is equal to K, or the error tolerance bound is reached. List "L" stores the set of nodes that are to be included. As K agents are selected, the list L is updated with the index of the agents.

With further reference to Table 1, at operation 1 there are datasets $D_1, D_2 \ldots D_n$ generated using a generator such as shown in FIG. 3 to create a private generator model for each agent. At operation 2 there are trained local models $M_1, M_2, \ldots M_n$ using the respective datasets $D_1, D_2 \ldots D_n$. At operation 3 a global dataset $D_g$ is generated using the agent datasets of the models, and the global dataset $D_g$ is used to train the global model $M_g$. The agents selected for federation are stored (operation 4). The accuracy of the global model $M_g$ on a test dataset $D_{test\ is}$ determined along with the fusion accuracy of the models (operation 5). The fusion accuracy (operation 6) and the attribute scores (operation 7) are determined. A fusion operation such as using a Fedavg algorithm is used to return a single model based on two models.

In each round the following operations are performed:

In operations 8-9, if L is empty (this is the scenario when the algorithm starts), a fusion model M_{fusion} is initialized to a random model M_{random}. The random model is simply a model whose parameters have been randomly initialized.

In operations 10-12, if the list L is not empty, then the fusion model M_{fusion} is initialized as the average of models from users who have already been included in the federation process.

In operation 14, using M_{fusion} as the global model there is a simulated federation performed between all the 'n' agents. This simulation includes agents that have been already selected and ones that are yet to the included. Each agent 'i', initialize their model M_{i} to M_{fusion} and start training using their local dataset D_{i}.

A simulated federation can be done in different ways, and the following two non-exhaustive examples are provided for illustrative purposes.

For example, a simulated federation can be performed in a multi-round-based approach that simulates operations of a central server. The simulation mediates federation between the 'n' agents. The agents share their local updates with the central server which fuses them into a global model. This global model is shared with the agents for the next round of local training and the process is repeated for a few rounds. The local models at the end of local training in the last round (before fusion at the server) are used in operations 14-17 of Table 1.

Another example of a simulated federation employs a much simpler simulation strategy. Each agent i, after initializing its model to M_{fusion}, performs local training to generate a new M_{i}. These models are used in operations 14-17.

Example Process

With the foregoing overview of the example architecture, it may be helpful now to consider a high-level discussion of an example process. To that end, in conjunction with FIGS. 1-3, FIGS. 4, 5, and 6 depict flowcharts 400, 500, 600a, and 600b illustrating various aspects of a computer-implemented method, consistent with an illustrative embodiment. Processes 400, 500, and 600a-600b are each illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 4:
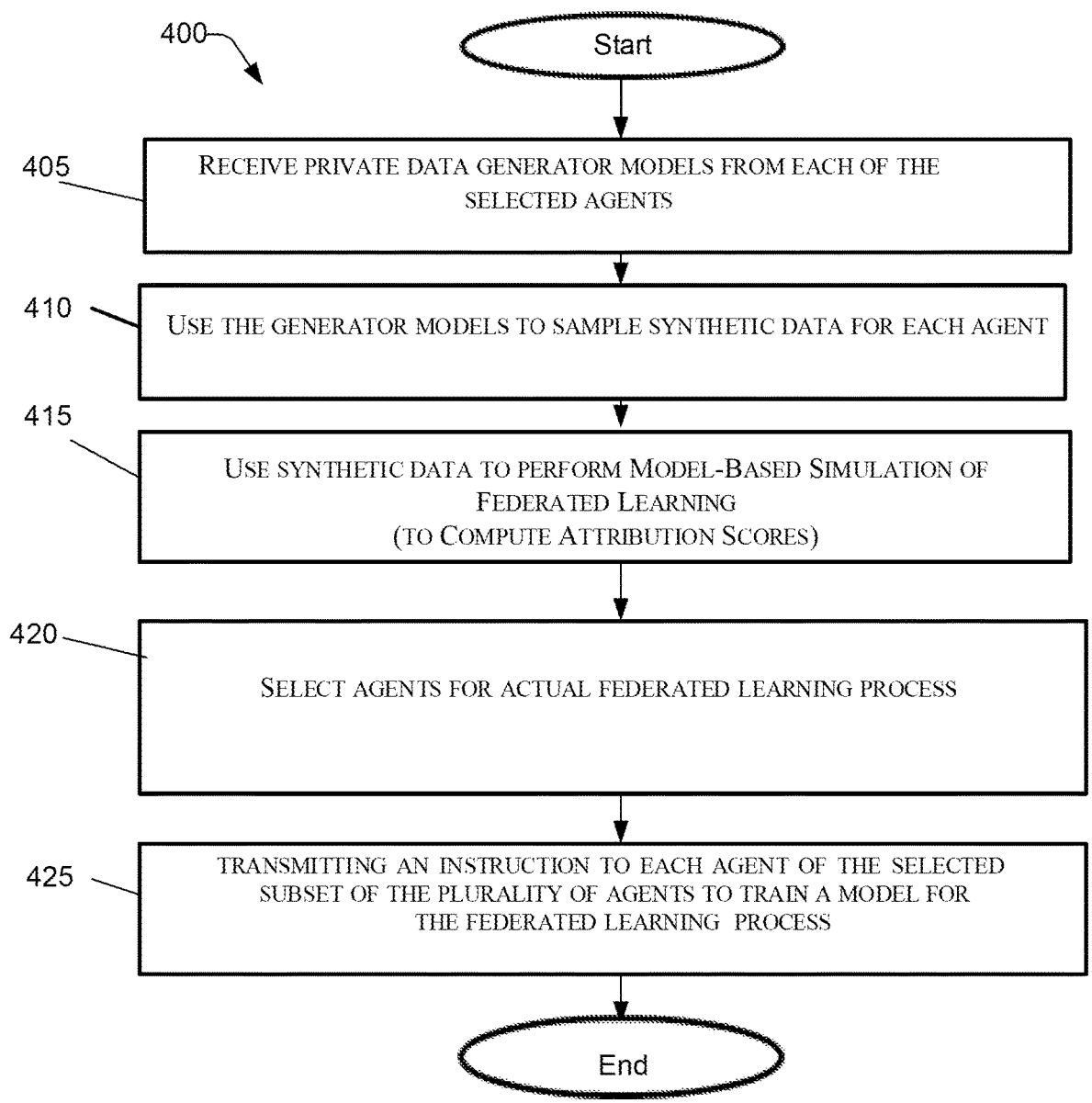
FIG. 4 is a flowchart illustrating a computer-implemented method of determining an agent data attribution and selection, consistent with an illustrated embodiment.

Referring now to FIG. 4, at operation 405, private data generator models for each of the agents initially participating in collaborative tasks are received by a server (e.g. this may be a fusion server 205 such as shown in FIG. 2).

At operation 410, generator models are used to sample synthetic data for each agent. The synthetic data may be generated such as described with regard to in FIG. 3, with a generator 315 and a discriminator 320.

At operation 415, a model-based simulation of federated learning using the synthetic data may be performed to compute attribution scores for each agent. A greedy strategy during the simulation and in each round may be employed that includes the agent whose model inclusion causes a maximum improvement in the accuracy of a federated model relative to a global model. The federated model is created by fusing models from agents that have already been included in previous rounds.

At operation 420, based on the simulation, the agents are selected for the actual federated learning process, based on the attribution score. The attribution score assigned to an agent is proportional to the accuracy improvement relative to the maximum accuracy of the global model.

At operation 425, the selected agents have transmitted fusion parameters and an instruction to train a model for the federated learning process. This iterative process may occur until it is determined that the fusion server can train a global model having a certain degree of accuracy.

Figure 5:
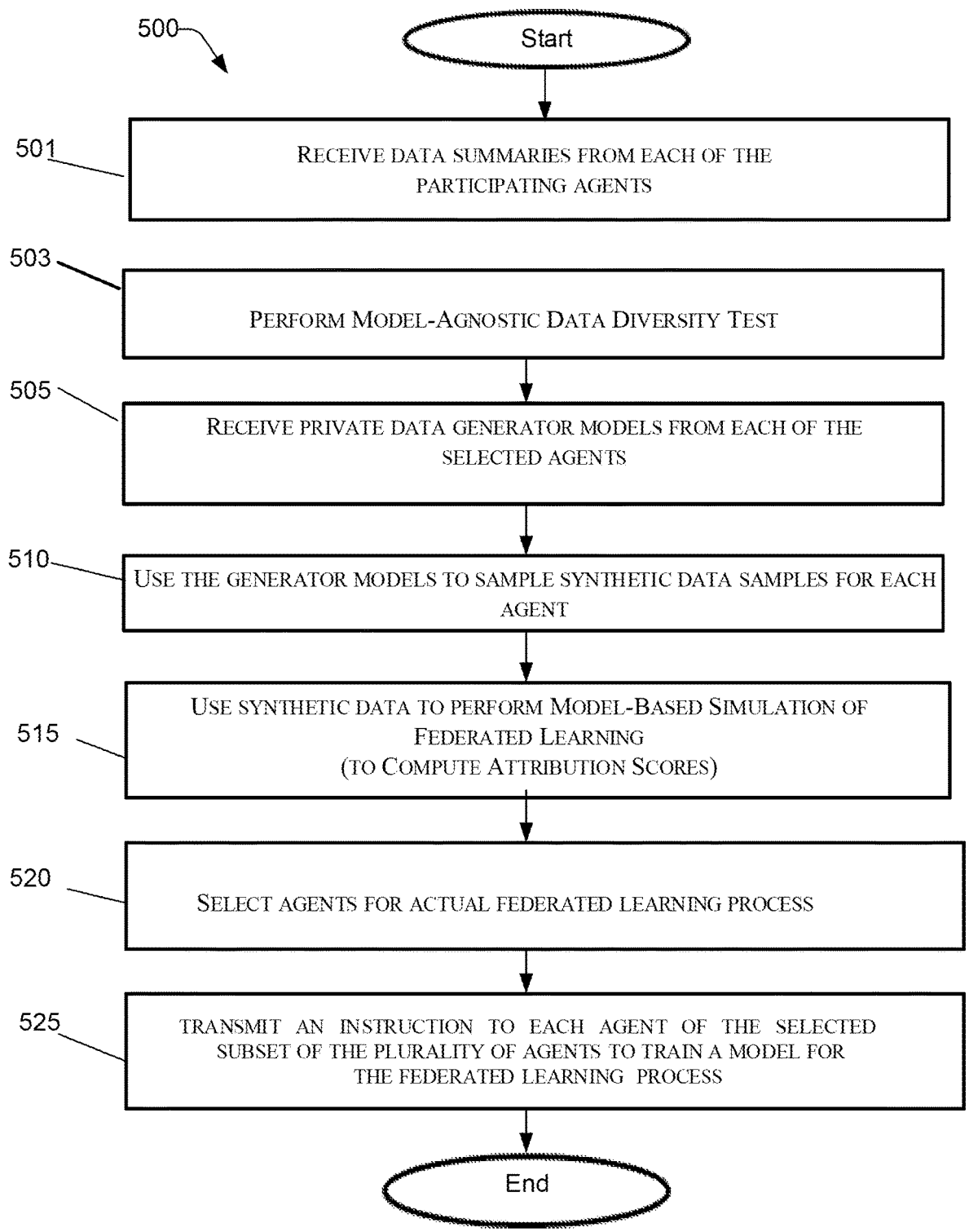
FIG. 5 is a flowchart illustrating a computer-implemented method of determining an agent data attribution and selection including a data diversity test, consistent with an illustrated embodiment.

FIG. 5 is a flowchart illustrating a computer-implemented method of determining an agent data attribution and selection including a data diversity test, consistent with an illustrated embodiment.

The operations 505 through 525 of FIG. 5 are analogous to operations 405 to 425 of FIG. 4 and are not repeated here to minimize redundancy in the explanation. The computer-implemented method of FIG. 5 includes a data diversity check. More particularly, at operation 501 data summaries and sketches from the agents are received by the server. At operation 503, a data-agnostic diversity test is performed. By including these operations 501 and 503 (which are optional), a more robust global model may be created and including more diverse data leads to increased accuracy of a global model.

The data diversity test may include agents that provide their data summaries in various forms for the server to select agents based on data diversity. For example, by determining private (noisy) centroids and silhouette scores of data clusters of an agent's data, the centroids reflect the concentration of the data and the silhouette scores reflect the tightness of the cluster. The server uses this information to exclude agents that introduce no diversity.

The data diversity test may include the use of private coresets. The coresets are a small set of data samples that approximate the shape/distribution of the data. There are techniques to make the shared coresets private before sharing. The server can use the obtained data sketches to perform clustering and use the cluster centroids to determine diversity between the agents. The operations 501 and 503 then can assist in attributing valuation scores and selection of agents from operation 505 onward, and as discussed in the operation of the flowchart of FIG. 4.

Figure 6A:
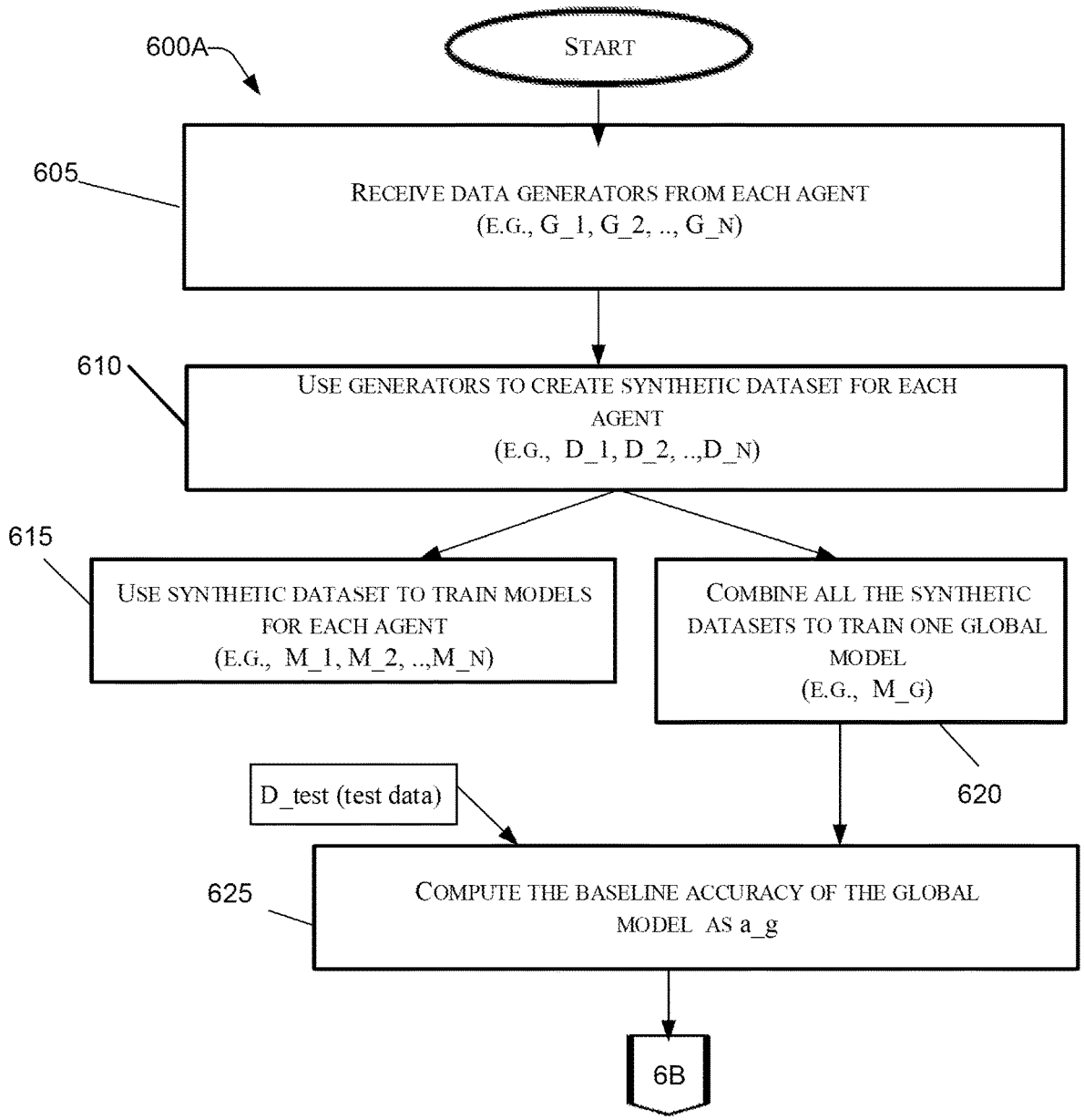
FIGS. 6A and 6B are flowcharts illustrating a computer-implemented method of a model-based simulation for federated learning, consistent with an illustrated embodiment.
Figure 6B:
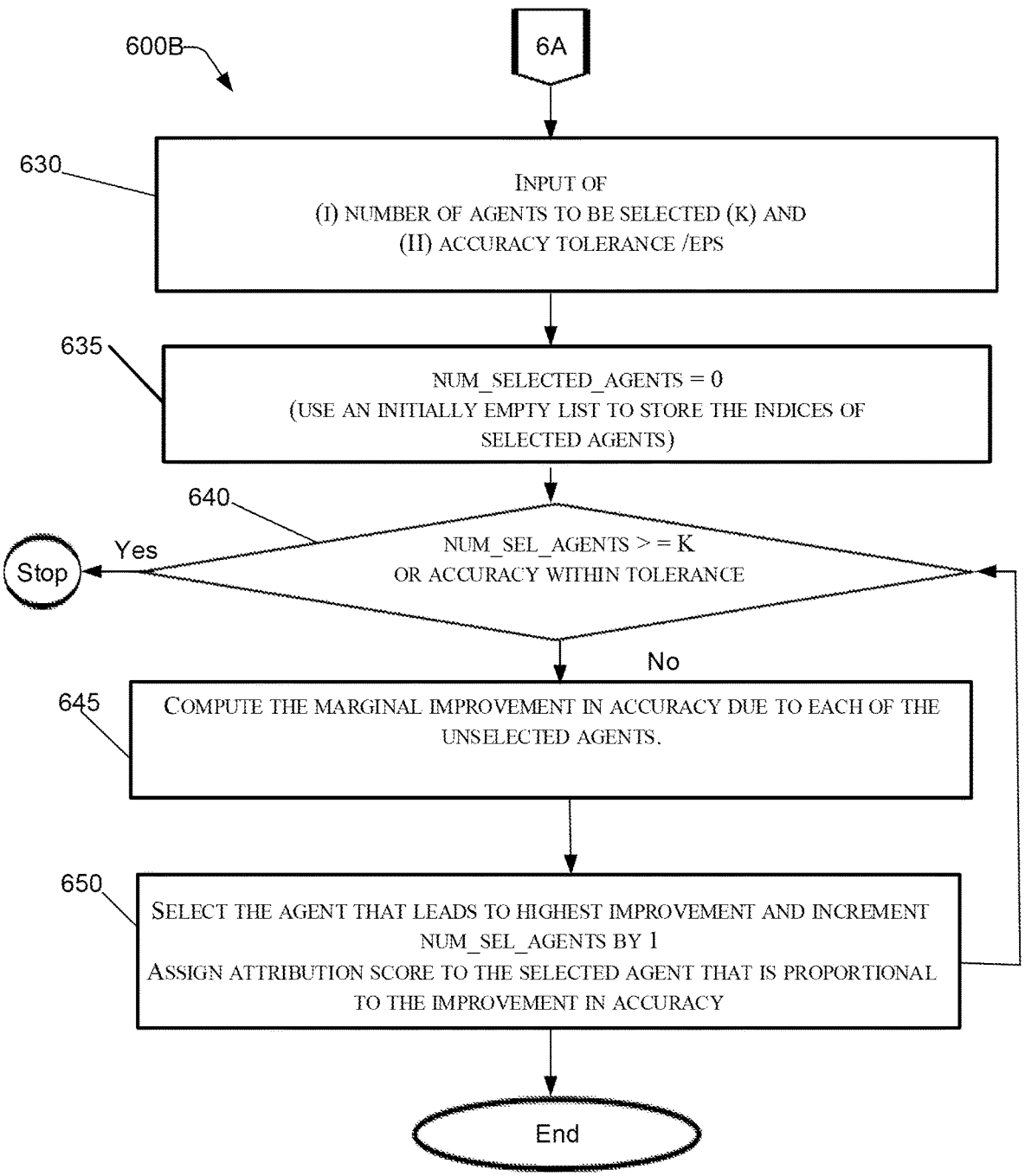

FIGS. 6A and 6B are flowcharts illustrating a computer-implemented method of a model-based simulation for federated learning, consistent with an illustrated embodiment.

At operation 605, there are private data generators (G_1, G_2 . . . G_n) from each agent that are received by a server. These data are created, for example, as disclosed hereinabove with the description of FIG. 3.

At operation 610, synthetic datasets (D_1, D_2 . . . D_n) are created by the server for each agent based on the data distribution of the data. As discussed herein above, the use of centroids, silhouettes, and core sets are some ways that synthetic data are created.

At operation 615, the synthetic data created by the server is used to trained models (M_1, M_2 . . . M_n) for each agent.

At operation 620, all the synthetic data sets are combined to train one global model $M_g$. There may have been a number of iterations between the server and the agents before the combining of all the synthetic data sets to train the global model $M_g$.

At operation 625, the baseline accuracy of the global model is computed as a_g. Referring to the description of the algorithm in Table 1 above, the accuracy of the global model $M_g$ on a test dataset $D_{test}$ is determined.

Now referring to FIG. 6B, it is to be understood that the accuracy of a model that has been trained using centralized data as the baseline is typically considered. For example, in a conventional form of model training, all the data is first collected at a location and then model is trained over this dataset. We refer to this accuracy as a_g.

The accuracy of the model, using the currently selected subset of agents is denoted as a_L. The accuracy tolerance refers to an amount of difference between a_g and a_L that is acceptable before the federation process is stopped. At operation 630, an input is taken based on the number of agents to be selected (K) and the accuracy of the accuracy tolerance/Epsilon (eps) compared to a baseline a_g.

At operation 635, an initially empty list is used to store the indices of selected agents (num_selected_agents=0).

At operation 640, it is determined whether the number of selected agents is greater than K. If yes, the method stops at operation 640. However, the number of agents is less than K, then at operation 645 the marginal improvement in accuracy due to each of the unselected agents is computed according to the following.

Federate between the already selected set of models (initially empty) and each of the non-selected models separately. For each resulting model, compute the accuracy on the test dataset D_test. Find that model which leads to the highest improvement in accuracy. Add that found model to the set of selected models. The attribution score of the selected model is proportional to the improvement in accuracy. Repeat the federating between the already selected set of models and each of the non-selected models until a required number K of agents are selected or the desired accuracy is achieved (with possibly lesser number of agents). The process then ends at operation 650 in which the agent is selected that leads to the highest improvement, and increment the number of selected agents by 1 (K+1). An attribution score is assigned to the agent that is proportional to the improvement in accuracy.

Figure 7:
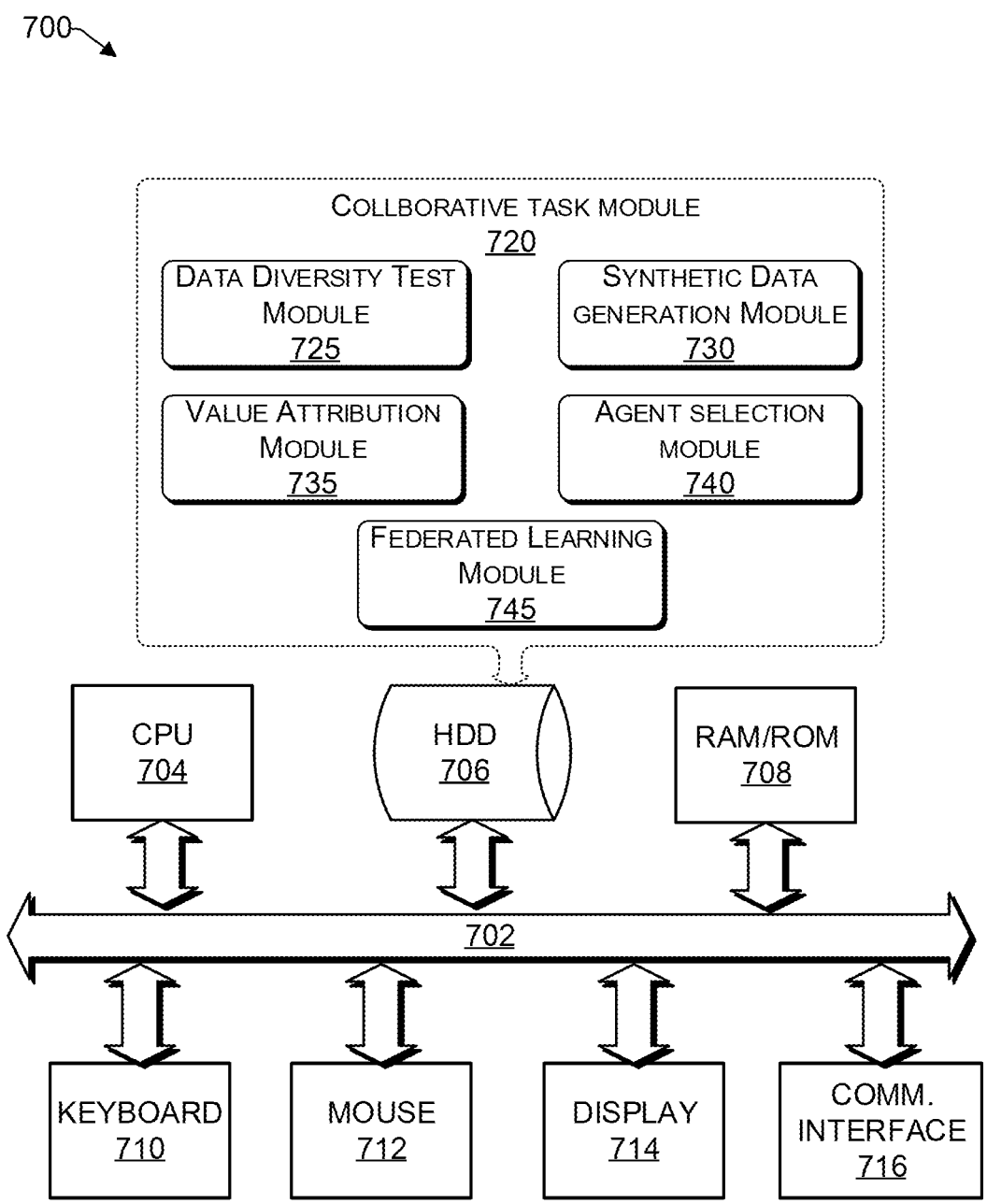
FIG. 7 is a functional block diagram illustration of a computer hardware platform that can communicate with agents in performing a collaborative task, consistent with an illustrative embodiment.

FIG. 7 provides a functional block diagram illustration 700 of a computer hardware platform. In particular, FIG. 7 illustrates a particularly configured network or host computer platform 700, as may be used to implement the methods shown in FIGS. 4, 5, 6A and 6B.

The computer platform 700 may include a central processing unit (CPU) 704, a hard disk drive (HDD) 706, random access memory (RAM) and/or read-only memory (ROM) 708, a keyboard 710, a mouse 712, a display 714, and a communication interface 716, which are connected to a system bus 702. The HDD 706 can include data stores.

In one embodiment, the HDD 706, has capabilities that include storing a program that can execute various processes, such as federated learning, federated inference, collaborative function estimation, and collaborative abnormality prediction. The collaborative task module 720, in a manner described herein above, is configured to manage the overall process.

The data diversity module 725 is configured to perform a model agnostic or data-specific check of agent-created models. A diversity check of a private data generator model is performed for each of the plurality of agents. The data diversity module 725 is configured to filter out agents whose data are close to other agents under consideration, and thus do not introduce any additional data diversity that would lead to any relative improvement in the model accuracy.

Data summaries can be provided to the data diversity module 725 in the form of cluster description (e.g., centroids, cluster diameter etc.), coresets (representation of the dataset), and data sketches. The data diversity module 725 may also be configured to determine private centroids and silhouette scores of data clusters of each of the private generator models, wherein the centroids reflect a concentration of the data and the silhouette scores reflect a tightness of the cluster. It is noted that the computer-implemented method may optionally include data diversity checks of the agents.

The synthetic data generation module 730 is configured to generate synthetic data for model simulation to preserve the privacy of the agents. Data generators can be in the form of parameterized models e.g., Generative Adversarial Networks (GANs) which model the distribution of the agent dataset. The synthetic data generated from each agent by the synthetic data generation module 730 are used to train agent specific models. The data are pooled together to train a global model (to obtain a baseline for the maximum accuracy possible).

The value attribution module 735 is configured to use a server-based simulation of the federation to privately determine the attribution score of each agent. The server uses the attribution scores to rank the participating agents and select the subset that can maximize the accuracy of the global model. For example, each agent is assigned an attribution score (e.g., a number between 0 and 1), such that a higher value indicates a greater contribution to the federation process (accuracy of the global model). The attribution score can be used in an unlimited number of ways, including but not in any way limited to agent compensation, agent selection, redundancy elimination, etc.

The agent selection module 740 is configured to select a subset of agents for a collaborative task. Starting with an initial set N of agents, in an illustrative embodiment, the subsets M and K are a respective number of agents after performing an optional data diversity check, and a model specific check (e.g., assigning an attribution score). By sequencing the checks in order, an implicit restriction may be imposed such that N>M>K. In other words, the data diversity check can eliminate agents whose data are already covered by included agents (but it is not strict and is designed to include most agents), and the model specific check is used to select a portion of the agents according to the attribution score.

The federated learning module 745 is configured to create a global training model for machine learning by using a federated learning process. The federated model is created by fusing models from agents that have already been included in previous rounds of iterations between a server (e.g. a fusion server 205 shown in FIG. 2 by the execution of a fusion algorithm) and the plurality of agents 210, 220, 230, 240, 250 such as shown in FIG. 2. The attribution score assigned to an agent is proportional to the accuracy improvement relative to the maximum accuracy of the global model. The agents are included in the iterations until with the server 205 until a predetermined number of agents 210, 230, 250 are selected (FIG. 2). The predetermined number of agents may be a number of agents or based on a particular attribution score, or a particular ranking, or a combination of one or more of such agent attributes.

Example Cloud Platform

As discussed above, functions relating to environmental and ecological optimization methods may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 8:
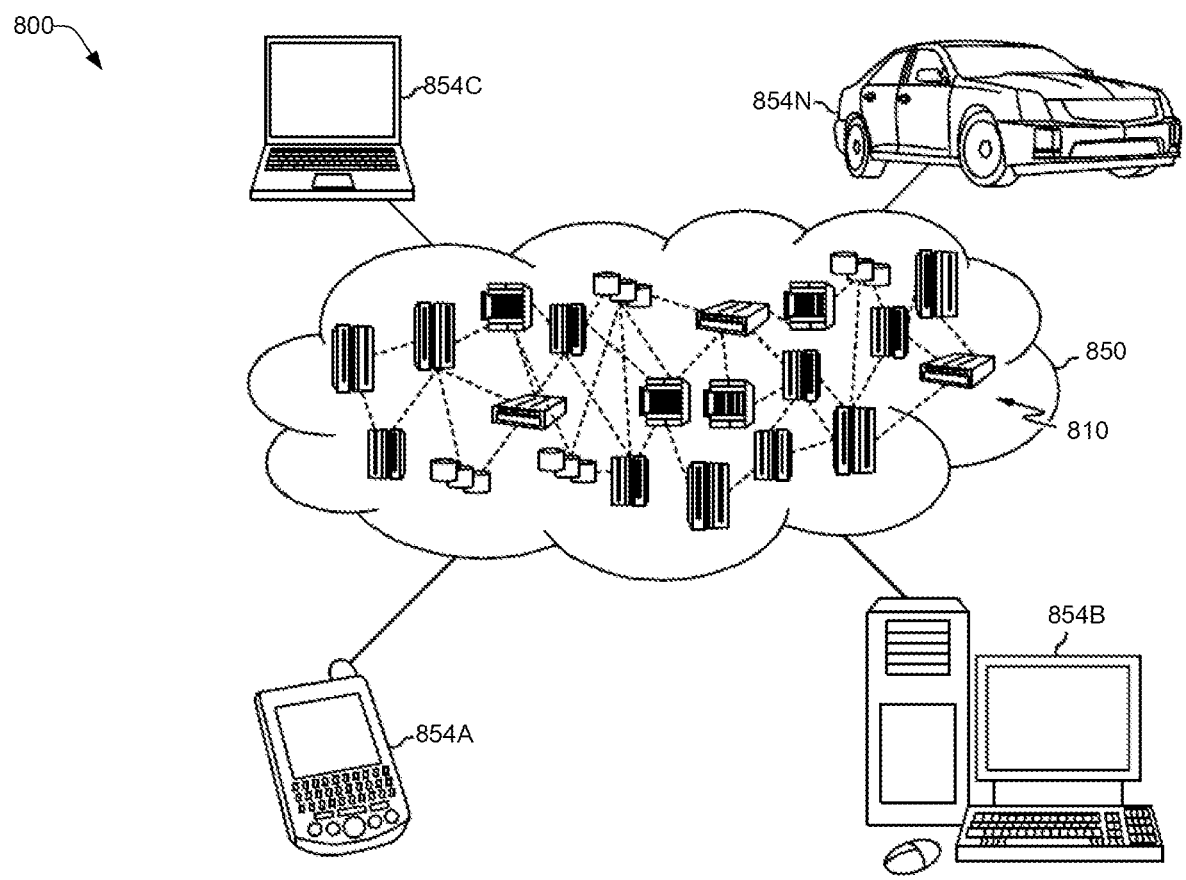
FIG. 8 depicts an illustrative cloud computing environment, consistent with an illustrative embodiment.

Referring now to FIG. 8, an illustrative cloud computing environment 800 utilizing cloud computing is depicted. As shown, cloud computing environment 800 includes cloud 850 having one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms, and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
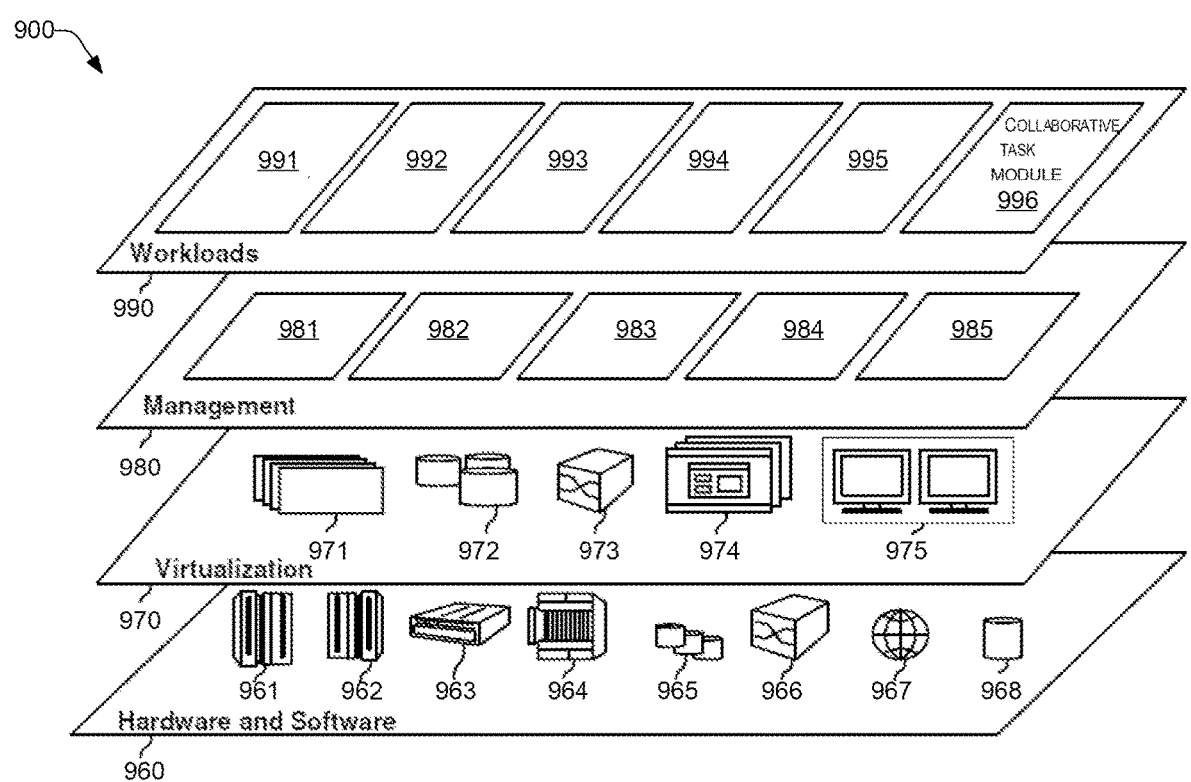
FIG. 9 depicts a set of functional abstraction layers provided by a cloud computing environment, consistent with an illustrative embodiment.

Referring now to FIG. 9, a set of functional abstraction layers 900 provided by cloud computing environment 800 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and a collaborative task module 996 to perform agent data attribution and selection in a federated learning system, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of determining an agent data attribution and selection to perform a collaborative data-related task, the computer-implemented method comprising:
   computing an agent data attribution score for each agent of a plurality of agents associated with the collaborative data-related task, wherein the data attribution score is an estimate of a relative contribution that an agent of the plurality of agents contributes to an overall accuracy of a global training model;
   selecting a subset of the plurality of agents to participate in the collaborative data-related task based on a corresponding agent data attribution score of each agent; and
   transmitting an instruction to the selected subset of the plurality of agents, respectively, for each agent to conduct a respective portion of the collaborative data-related task.

2. The computer-implemented method according to claim 1, further comprising:
   receiving a private sketch of data and resources of a plurality of agents associated with the collaborative data-related task;
   excluding one or more of the plurality of agents from performing the collaborative data-related task based on a lack of a diversity of data of the private sketch of data compared with a remainder of the plurality of agents prior to computing the agent data attribution score;
   receiving results including local parameters from the subset of selected agents instructed to conduct the respective portion of the collaboratively performed data-related task; and
   generating fused parameters from the received local parameters and transmitting an instruction to at least some of the selected subset of the plurality of agents, respectively, to conduct the respective portion of the collaborative data-related task iteratively using fused parameters to train a respective private generator model.

3. The computer-implemented method according to claim 2, further comprising:
   receiving refined results from the selected agents based on the fused parameters; and
   generating the global training model based on the refined results.

4. The computer-implemented method according to claim 2, wherein the selecting of the subset of the plurality of agents comprises precluding one or more agents from participating in the collaborative data-related task by determining whether an accuracy of the fused parameters improves the global training model by having a particular one of the one or more agents participate in the collaborative data-related task.

5. The computer-implemented method according to claim 2, wherein the selecting of the subset of the plurality of agents comprises precluding one or more agents of the plurality of agents from participating in the collaborative data-related task based on a relatively lower amount of data diversity as compared with other agents of the plurality of agents under consideration for selection.

6. The computer-implemented method according to claim 2, wherein the private sketch of data of the plurality of agents includes private data generator models summarizing the data distribution of each agent of the plurality of agents, and the method further comprises:
   performing a data diversity check of a private data generator model for each of the plurality of agents based on the private sketch of data of the private sketch of data, and
   eliminating one or more agents from inclusion in the computing of the data attribution score based on a lack of data diversity.

7. The computer-implemented method according to claim 6, wherein:
   performing the data diversity check of the private generator models includes determining private centroids and silhouette scores of data clusters of each of the private generator models; and the centroids reflect a concentration of the data and the silhouette scores reflect a tightness of the cluster.

8. The computer-implemented method according to claim 2, wherein the received private sketch of data of the plurality of agents includes private coresets of data that approximate a shape and distribution of the data, and the method further comprises:
performing a data diversity check by clustering the private coresets of data; and
comparing an arrangement of cluster centroids for diversity.

9. The computer-implemented method according to claim 2, wherein private sketch of data of the plurality of agents includes a respective private data generator model summarizing the data distribution of each agent of the plurality of agents, and the computing of the agent data attribution score further comprises:
generating synthetic data from a corresponding data distribution of the private generator model of each agent from a corresponding data distribution; and
training agent-specific models using the generated synthetic data.

10. The computer-implemented method according to claim 9, further comprising pooling the generated synthetic data to train a global model.

11. The computer-implemented method according to claim 2, wherein the collaborative data-related task comprises generating a global training model by federated learning using the private sketch of data and resources information of at least the subset of the plurality of agents.

12. The computer-implemented method according to claim 2, wherein the collaborative data-related task comprises computing a collaborative function estimation of a summary sketch of data and resources information of at least the subset of the plurality of agents.

13. The computer-implemented method according to claim 12, wherein the collaborative data-related task comprises computing a federated inference based on the summary sketch of data and resources information of at least the subset of the plurality of agents.

14. A computing device for determining an agent data attribution and selection to perform a collaborative data-related task, the computing device comprising:
a processor;
a memory coupled to the processor, the memory storing instructions to cause the processor to perform acts comprising:
computing an agent data attribution score for each agent of a plurality of agents associated with the collaborative data-related task, wherein the data attribution score is an estimate of a relative contribution that an agent of the plurality of agents contributes to an overall accuracy of a global training model;
selecting a subset of the plurality of agents to participate in the collaborative data-related task based on a corresponding agent data attribution score of each agent; and
transmitting an instruction to the selected subset of the plurality of agents for each agent to conduct a respective portion of the collaborative data-related task.

15. The computing device according to claim 14, wherein the instructions cause the processor to perform additional acts comprising:
receiving a private sketch of data and resources of a plurality of agents associated with the collaborative data-related task;
excluding one or more of the plurality of agents from performing the collaborative data-related task based on a lack of a diversity of data of the private sketch of data compared with a remainder of the plurality of agents prior to computing the agent data attribution score;
receiving results including local parameters from the subset of selected agents instructed to conduct the respective portion of the collaboratively performed data-related task, and
generating fused parameters from the received local parameters and transmitting an instruction to at least some of the selected subset of the plurality of agents, respectively, to conduct the respective portion of the collaborative data-related task using fused parameters.

16. The computing device according to claim 15, wherein the instructions cause the processor to perform additional acts comprising:
receiving refined results from the selected agents based on the fused parameters; and
generating the global training model based on the refined results.

17. The computing device according to claim 15, wherein the instructions cause the processor to perform additional acts comprising:
selecting the subset of the plurality of agents by precluding one or more agents of the plurality of agents from participating in the collaborative data-related task based on a relatively lower amount of data diversity as compared with other agents of the plurality of agents under consideration for selection.

18. The computing device according to claim 14, wherein the instructions cause the processor to perform additional acts comprising:
generating synthetic data from a corresponding data distribution of a private generator model of each agent from a corresponding data distribution; and
training agent-specific models using the generated synthetic data.

19. A non-transitory computer-readable storage medium tangibly embodying a computer-readable program code having computer-readable instructions that, when executed, causes a computer device to perform a method of determining an agent data attribution and selection to perform a collaborative data-related task, the method comprising:
optionally receiving a summary sketch of data and resources of a plurality of agents associated with the collaborative data-related task to exclude one or more agents based on data diversity;
computing an agent data attribution score for each agent of a plurality of agents associated with the collaborative data-related task, wherein the data attribution score is an estimate of a relative contribution that an agent of the plurality of agents contributes to an overall accuracy of a global training model;
selecting a subset of the plurality of agents to participate in the collaborative data-related task based on a corresponding agent data attribution score of each agent;
transmitting an instruction to the selected subset of the plurality of agents, respectively, for each agent to conduct a respective portion of the collaborative data-related task;
receiving results including local parameters from the subset of selected agents instructed to conduct the respective portion of the collaboratively performed data-related task; and
generating a global training model based on the received results.

* * * * *